United States Patent [19]

Kurths

[11] Patent Number: 4,853,730

[45] Date of Patent: Aug. 1, 1989

[54] CLAMP MOUNTING MECHANISM AND METHOD FOR PHOTOGRAPHIC PROCESSING APPARATUS

[75] Inventor: Siegfried Kurths, Munich, Fed. Rep. of Germany

[73] Assignee: Afga-Gevaert Aktiengesellschaft, Leverkusen, Fed. Rep. of Germany

[21] Appl. No.: 166,871

[22] Filed: Mar. 11, 1988

[30] Foreign Application Priority Data

Mar. 21, 1987 [DE] Fed. Rep. of Germany ....... 3709412

[51] Int. Cl.$^4$ ....................... G03B 1/56; G03D 13/10; B65H 20/16

[52] U.S. Cl. ....................................... 354/340; 226/92; 29/235; 29/243.5; 29/453; 354/321

[58] Field of Search ............... 354/320, 321, 322, 340, 354/344, 345; 226/91, 92, 173; 29/235, 243.5, 453

[56] References Cited

U.S. PATENT DOCUMENTS 2,878,924 3/1959 Dye et al. .......................... 354/321
3,713,649 1/1973 Kempen et al. ...................... 226/92
4,055,289 10/1977 Kaiser et al. ......................... 226/92
4,065,042 12/1977 Zielinski ............................... 226/92
4,773,580 9/1988 Schweiger ........................... 226/92

FOREIGN PATENT DOCUMENTS 2246313 8/1978 Fed. Rep. of Germany .

*Primary Examiner*—A. A. Mathews
*Attorney, Agent, or Firm*—Peter K. Kontler

[57] ABSTRACT

A photographic developing apparatus has an elastic conveyor belt and at least one clamp which is designed to be mounted on the conveyor belt and to engage a strip of photographic material. The clamp has spaced gripping elements which define an opening of width less than that of the conveyor belt and are arranged to engage the marginal portions of the belt. A mechanism for mounting the clamp on the conveyor belt is also provided and includes a female die as well as a male die. The mounting mechanism additionally includes means for juxtaposing the clamp and the belt with one another in such a manner that the central portion of the belt and the opening in the clamp are each in register with a cavity in the female die while the marginal portions of the belt are movably confined between the clamp and support surfaces on the female die. When the clamp and the belt are thus positioned, the male die is moved into the female die. This causes the marginal portions of the belt to approach one another. When the marginal portions are released from their confinement, they snap into the opening of the clamp. The male die is then withdrawn so that the conveyor belt straightens and the marginal portions thereof come into firm engagement with the gripping elements of the clamp.

33 Claims, 4 Drawing Sheets

14a
10b
8c
14
8b
13e
13d
8c
2
13
13c
13a
13f
8a
13b 14a
10b
14
8b
13e
13d
13
2
13a
13b
8a 14
14a
10b
8b
13e
13d
13c
13
2
13a
8a 10b
8b
13e
13
2
8a 10b
8b
13
2
8a

CLAMP MOUNTING MECHANISM AND METHOD FOR PHOTOGRAPHIC PROCESSING APPARATUS

BACKGROUND OF THE INVENTION

The invention relates generally to the processing of photosensitive material.

More particularly, the invention relates to the processing of a band of photosensitive material by drawing the band through one or more processing tanks via a conveyor belt.

A known apparatus for processing a band of photosensitive material has a series of processing tanks. A conveyor belt passes through the various tanks and is provided with a clamp which is designed to engage the leading end of the band. This allows the conveyor belt to draw the band through the tanks for processing. The clamp engages the leading end of the band in such a manner that the latter travels in parallelism with the belt.

The clamp is held on the conveyor belt by friction. To this end, the clamp is provided with a pair of hook-like gripping or engaging elements which embrace, and are in frictional engagement with, the marginal portions of the belt. The gripping elements are spaced from one another transversely, and define an opening of width smaller than that of the belt. The clamp is mounted on the belt by bending the latter so that the marginal portions of the belt approach one another to a distance smaller than the width of the opening defined by the gripping elements. This allows the marginal portions to be introduced into the opening to thereby engage the gripping elements. Bending of the belt is accomplished using cooperating male and female dies which act in a direction normal to the plane of the belt.

An apparatus of the above type is disclosed, for example, in West German Pat. No. 25 12 836. The female die is here in the form of a roller configurated as a hyperboloid of one sheet while the male die is constituted by a pressure roller. When a clamp is to be mounted on the conveyor belt, the pressure roller urges the belt into the depression of the hyperboloid roller. This causes the belt to be bent to such an extent that the marginal portions of the belt move towards one another until the distance between them is less than the width of the opening defined by the gripping elements of the clamp. The clamp is supported by a holder preparatory to being mounted on the belt and, once the belt has been bent, the holder is moved towards the belt so that the marginal portions of the latter can enter the opening between the gripping elements. The pressure roller is now withdrawn thereby permitting the belt to straighten itself. Since the width of the belt is slightly larger than the width of the space inside the gripping elements, the belt retains some elastic deformation. This deformation causes the clamp to be secured to and drawn along by the belt through the agency of frictional forces.

Movement of the clamp towards the belt after bending increases the time required for attachment of the clamp to the belt. Moreover, since such movement is accomplished using a separately controlled holder for the clamp, the cost of the apparatus is increased.

OBJECTS AND SUMMARY OF THE INVENTION

It is an object of the invention to provide a method which makes it possible to reduce the time required for mounting a clamp on a conveyor belt.

Another object of the invention is to provide a method which enables a clamp to be attached to a conveyor belt using relatively inexpensive means.

An additional object of the invention is to provide a method which allows a clamp to be mounted on a conveyor belt without moving the clamp towards the latter during the mounting operation.

It is also an object of the invention to provide an arrangement which enables the time required for attachment of a clamp to a conveyor belt to be reduced.

Yet another object of the invention is to provide an arrangement which permits the employment of relatively inexpensive means for securing a clamp to a conveyor belt.

A further object of the invention is to provide an arrangement which makes it unnecessary to move a clamp towards a conveyor belt during mounting of the clamp on the belt.

The preceding objects, as well as others which will become apparent as the description proceeds, are achieved by the invention.

One aspect of the invention resides in a method of mounting a gripping device or clamp for photosensitive material on a flexible conveyor belt of a processing apparatus for the material. The belt has a pair of laterally spaced marginal portions and a central portion bounded by the marginal portions. The clamp includes a pair of spaced gripping or engaging elements defining an opening of width less than that of the belt and designed to engage the marginal portions upon entry of the latter into the opening. The gripping elements are preferably in the form of hooklike projections which are arranged to embrace the marginal portions of the belt. The method involves confining the marginal portions between the clamp and a pair of spaced support surfaces (the support surfaces may, for example, be constituted by surfaces of a female die). The confining step is performed in such a manner that the central portion of the belt and the opening between the gripping elements each at least partially overlap the gap between the support surfaces. The method further comprises the step of bending the central portion of the belt, e.g., by means of a male die, while allowing the marginal portions to approach one another so that the latter enter the opening between the gripping elements. It is preferred to carry out the bending step such that the distance between the marginal portions of the belt is reduced to less than the width of the opening at which time the marginal portions snap into such opening. The central portion of the bent is substantially straightened so that the marginal portions are firmly engaged by the gripping elements (the belt may be straightened by disengaging the male die from the belt and either allowing the latter to straighten itself or positively straightening the same).

The confining and bending steps may be performed in such a manner that the gripping elements are substantially symmetrically arranged relative to the belt during the initial part of the bending step while the belt is substantially symmetrically bent during this part of the bending step. Symmetrical bending of the belt may be achieved by guiding the belt so that it is symmetrical with reference to the male die.

The confining step is preferably carried out such that the clamp and the marginal portions of the belt are in continuous contact during the initial part of the bending step. The belt defines a predetermined plane prior to being bent and it is further preferred for the confining step to be performed in such a manner that the marginal portions of the belt are held in this plane until they enter the opening between the gripping elements. The dies used for the bending operation advantageously act in a direction normal to such plane.

By keeping the clamp in contact with the marginal portions of the belt during the bending operation, the marginal portions are held adjacent to the clamp and essentially in the plane originally defined by the belt. On the other hand, the central portion of the belt is bent away from the clamp by a male die. Due to this bending, the marginal portions are drawn progressively inwardly until these reach the inner edges of the gripping elements of the clamp. The marginal portions can then snap into the interior of the gripping elements. When this occurs, the marginal portions move in a direction counter to the male die. This makes it unnecessary to separately move the clamp towards the belt.

The method of the invention for attachment of a clamp can also be used for a clamp of the type disclosed in the West German Pat. No. P 35 35 852. Such clamp is flat and is provided with a cutout having a length and width which correspond approximately to the width of the conveyor belt. Projections for engaging the lateral edges of the belt extend into the cutout.

The method of the invention can also be applied to a clamp of the type comprising a strip having two hooks which are bent out of the plane of the strip and are again designed to embrace the marginal portions of the conveyor belt. These hooks define a space of width slightly smaller than that of the belt and height somewhat greater than the thickness of the belt.

Another aspect of the invention resides in an apparatus for processing photosensitive material. The apparatus comprises a flexible conveyor belt for advancing the photosensitive material along a predetermined path and the belt has a pair of laterally spaced marginal portions as well as a central portion bounded by the marginal portions. A gripping device or clamp for the photosensitive material is mountable on the belt and includes a pair of spaced engaging or gripping elements defining an opening of width less than that of the belt and designed to engage the marginal portions of the latter upon entry of the marginal portions into the opening. The apparatus further comprises means for mounting the clamp on the belt. The mounting means includes means for bending the belt so that the marginal portions thereof can approach one another to enter the opening, and means for juxtaposing the belt and the clamp in the bending means preparatory to bending of the belt such that the central portion of the belt and the opening between the gripping elements at least partially overlap one another.

The bending means may include cooperating male and female dies. At least one of the dies, preferably the male die, is movable between an inoperative position and an operative position in which the central portion of the belt is bent to such an extent that the marginal portions thereof snap into the opening between the gripping elements. The movable die is advantageously arranged to reverse its direction of movement upon arrival at the operative position. The juxtaposing means may comprise a guide channel for the belt and the clamp. The guide channel may be formed in the bending means, preferably the female die. The juxtaposing means may be designed to position the belt and the gripping elements symmetrically relative to one another and with respect to the bending means.

The apparatus of the invention may be arranged to process elongated bands or strips of photosensitive material. The clamp may then be designed to engage the leading end of a band or strip in such a manner that the band or strip is drawn along in parallelism with the conveyor belt. The apparatus may include a series of processing tanks or vessels and the belt may extend through each of these vessels to thereby convey the band or strip through the vessels.

The apparatus of the invention may, for instance, constitute a photographic developing machine.

The novel features which are considered as characteristic of the invention are set forth in particular in the appended claims. The improved processing apparatus itself, however, both as to its construction and its mode of operation, will be best understood upon perusal of the following detailed description of certain specific embodiments with reference to the accompanying drawings.

DESCRIPTION OF THE PREFERRED EMBODIMENTS

Figure 1:
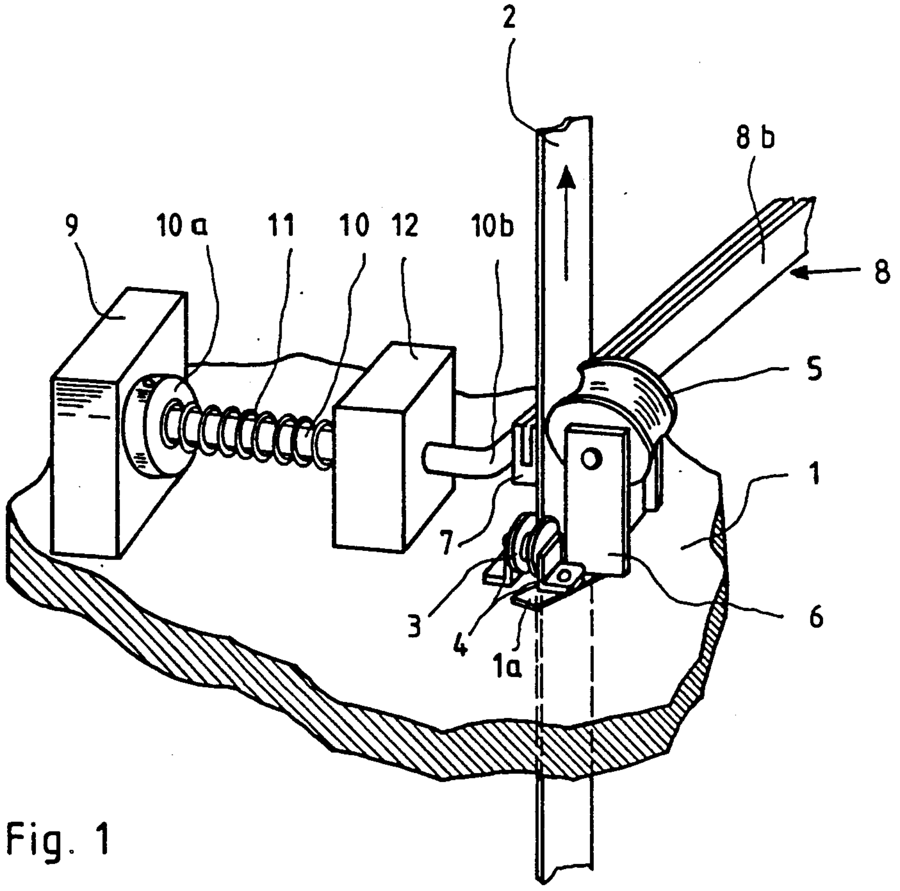
FIG. 1 is a fragmentary schematic perspective view of an apparatus according to the invention showing one embodiment of a mechanism for mounting a clamp on a conveyor belt.

FIG. 1 shows a photographic developing apparatus. The apparatus includes a series of non-illustrated processing tanks or vessels as well as a flexible, elastic conveyor belt 2 which extends, and defines a predetermined path, through the vessels. The conveyor belt 2, which is driven by a conventional non-illustrated drive mechanism, functions to draw elongated bands or strips of photographic material, e.g., photographic copy paper, through the vessels. To this end, the conveyor belt 2 carries at least one gripping device or clamp 8. The clamp 8 includes a one-piece gripping portion of sheet material which is not visible in FIG. 1 and serves to secure the clamp 8 to the conveyor belt 2. The manner in which the gripping portion is mounted on the conveyor belt 2 is described in more detail below. The clamp 8 further includes an arm 8*b* which is welded to the gripping portion and, in conventional manner, is provided with a longitudinal slot. The leading end of a band or strip of photographic material, which may arrive at the developing apparatus in the form of a roll, can be threaded through the slot and wrapped around the arm 8$b$. The band or strip can then be pulled through the various processing vessels of the developing apparatus in parallelism with, and along the path defined by, the conveyor belt 2.

The developing apparatus additionally comprises a base plate 1 which supports a mechanism for mounting the clamp 8 on the conveyor belt 2. The base plate 1 is provided with a slit 1$a$ through which the conveyor belt 2 travels upwards as indicated by the arrow. The conveyor belt 2 is flexible as mentioned previously and may, for example, be composed of an elastic synthetic resin. Two guide rollers 3, of which only one is visible in FIG. 1, are disposed above the base plate 1 and engage the edges of the conveyor belt 2. The rollers 3, which function to guide the conveyor belt 2, are freely rotatable in bearings 4.

Mounting of the clamp 8 on the conveyor belt 2 takes place above the guide rollers 3. The mechanism used for this purpose includes a support roller 5 which is freely rotatable in a bearing 6. The mechanism also includes a holder 7 having a slot which receives and supports the clamp 8 preparatory to mounting of the latter on the conveyor belt 2. After passing by the guide rollers 3, the conveyor belt 2 travels between the support roller 5 and the holder 7.

The holder 7 is arranged in such a manner that the arm 8$b$ of the clamp 8 is located on the far side of the conveyor belt 2 as seen in FIG. 1. Another holder similar to the holder 7 may be provided to support the clamp 8 such that the arm 8$b$ is disposed on the near side of the conveyor belt 2. Alternatively, the holder 7 may be provided with a first slot on the far side of the conveyor belt 2 and a second slot on the near side of the same. The first slot then functions to support the clamp 8 is illustrated in FIG. 1, namely, with the arm 8$b$ on the far side of the conveyor belt 2, while the second slot functions to support the clamp 8 with the arm 8$b$ on the near side of the conveyor belt 2.

The support roller 5 constitutes a female die. To this end, the support roller 5 is formed with a central, relatively deep depression extending circumferentially of the roller 5 and bounded by two relatively narrow circular rims. The conveyor belt 2 rides on these rims during normal operation. The depression, which has an approximately hyperbolic configuration, defines the peripheral surface of that portion of the support roller 5 between the rims.

The mounting mechanism further includes a plunger 10 carrying a male die 10$b$ which is arranged to cooperate with the support roller 5. The plunger 10 is mounted on and projects from a drive 9 which is designed to move the plunger 10 back-and-forth in a direction normal to the plane of the conveyor belt 2. The drive 9 may, for example, comprise a pneumatic cylinder or an electromagnet. In the event that powered drive units are unavailable, the drive 9 may include a manually compressible or extensible spring. Alternatively, the plunger 10 may then be moved directly by hand. The plunger 10 extends from the drive 9 through a guide 12 which slidably receives the plunger 10. Both the drive 9 and guide 12 are secured to the base plate 1.

The plunger 10 carries a collar 10$a$ which is located adjacent to the drive 9 and constitutes an abutment. A return spring 11 is coiled about the plunger 10 between the drive 9 and the guide 12. One end of the spring 11 bears against the collar 10$a$ while the other end of the spring 11 bears against the guide 12.

The male die 10$b$ is disposed on the side of the guide 12 remote from the drive 9. The plunger 10 has an inoperative position in which the male die 10$b$ is spaced from the conveyor belt 2 and support roller 5. The plunger 10 further has an operative position in which the male die 10$b$ is located immediately below the holder 7 and the gripping portion of the clamp 8 and projects into the depression of the support roller 5. When the plunger 10 is moved from its inoperative to its operative position, the male die 10$b$ engages the central portion of the conveyor belt 2 and forces this into the depression of the support roller 5. This causes the conveyor belt 2 to be bent or folded so that the marginal portions or edges thereof approach one another. As will be explained below, bending or folding of the conveyor belt 2 allows the clamp 8 to be mounted on the same.

FIG. 2$a$ illustrates another embodiment of the mechanism for mounting the clamp 8 on the conveyor belt 2. In contrast to FIG. 1 where the conveyor belt 2 travels in a vertical direction, the conveyor belt 2 in FIG. 2$a$ moves horizontally. The direction of travel of the conveyor belt 2 in FIG. 2$a$ is perpendicular to the plane of the paper.

The gripping portion of the clamp 8 is visible in FIG. 2$a$ and is identified by the reference numeral 8$a$. The gripping portion 8$a$ which, as mentioned earlier, is made of one piece from sheet material, includes two gripping or engaging elements in the form of hooks 8$c$. The hooks 8$c$ delimit a space or chamber which is designed to receive the conveyor belt 2. This chamber has a height somewhat greater than the thickness of the conveyor belt 2 but a width slightly smaller than the width of the latter. When the conveyor belt 2 is introduced into the chamber in the manner to be described, the conveyor belt 2 attempts to flatten. However, since the width of the chamber is slightly smaller than that of the conveyor belt 2, the conveyor belt 2 is virtually but not entirely flat and the edges of the conveyor belt 2 bear against the inner sides of the hooks 8$c$ with a relatively great force. As a result, relatively large frictional forces exist between the conveyor belt 2 and the clamp 8 so that the clamp 8 is entrained by the conveyor belt 2.

The hooks 8$c$ are spaced from one another to define an opening through which the conveyor belt 2 can be introduced into the chamber. The opening has a width smaller than that of the conveyor belt 2. This requires that the conveyor belt 2 be bent or folded for introduction into the chamber.

In FIG. 2$a$, the support roller 5 of FIG. 1 is replaced by a fixed female die 13. The female die 13 is provided with a guide channel which serves to juxtapose the conveyor belt 2 and the gripping portion 8$a$ of the clamp 8 so that the central portion of the conveyor belt 2 is in register with the opening in the gripping portion 8$a$. The guide channel is stepped and comprises a first section 13$a$ having a width and depth which respectively match the width and thickness of the conveyor belt 2. The guide channel further comprises a second section 13$d$ which is located above the first channel section 13$a$ and has a width and depth respectively corresponding to the width and height of the gripping portion 8$a$ of the clamp 8. The second channel section 13$d$ is open at its downstream end as considered in the direction of advance of the conveyor belt 2 in order that the gripping portion 8$a$ may freely exit the guide channel 13$a$, 13$d$ after being entrained by the conveyor belt 2.

The guide channel 13*a,* 13*d* functions to position the conveyor belt 2 and the gripping portion 8*a* of the clamp 8 symmetrically with reference to one another. In this position, the central portion of the conveyor belt 2 is in register with the opening in the gripping portion 8*a.* The guide channel 13*a,* 13*d* also functions to position the conveyor belt 2 and the gripping portion 8*a* symmetrically relative to the male die 10*b* and the female die 13.

The first channel section 13*a* defines a pair of spaced support surfaces 13*f* for the two lateral marginal portions of the conveyor belt 2 which flank the central portion of the latter. The widths of the support surfaces 13*f* are small compared to the width of the conveyor belt 2. The support surfaces 13*f* have inner edges 13*c* which confront one another and are spaced by a distance smaller than the width of the opening in the gripping portion 8*a* of the clamp 8.

A die cavity 13*b* is provided in the female die 13 and is symmetrically disposed with reference to the guide channel 13*a,* 13*d* and the male die 10*b.* Accordingly, the central portion of the conveyor belt 2, as well as the opening in the gripping portion 8*a* of the clamp 8, are in register with the die cavity 13*b* when the conveyor belt 2 and gripping portion 8*a* are positioned in the guide channel 13*a,* 13*d.* In the illustrated embodiment, the die cavity 13*b* tapers conically inwardly in a direction away from the guide channel 13*a,* 13*d.* However, this is not necessary.

The upper end of the female die 13 is formed with inclined shoulders 13*e* while the arm 8*b* of the clamp 8 is provided with a kink which matches the shoulders 13*e.* When the gripping portion 8*a* of the clamp 8 is positioned in the second channel section 13*d,* the kink in the arm 8*b* bears against one of the shoulders 13*e.* This assists in guiding the clamp 8 as the latter is entrained by the conveyor belt 2 and moves in the direction of advance of the latter.

The clamp 8 is held in the illustrated position in the second channel section 13*d* by a fixed cover 14. The cover 14 replaces the guide 12 of FIG. 1 and is provided with a passage 14*a* which serves to guide the male die 10*b.* The clamp 8 has a cutout in register with the passage 14*a* so that the male die 10*b* can enter the cavity 13*b* of the female die 13. The cover 14 is spaced from the female die 13 by a distance such that the clamp 8 can be freely moved on the conveyor belt 2 or the horizontal surfaces of the channel but with little clearance. The clearance for travel of the conveyor belt 2 through the mounting mechanism is selected in such a manner that, in the absence of the clamp 8, a conveyor belt connector having the configuration of a coil spring can pass through without hindrance.

Figures 2A, 2B, 2C, 2D, 2E:
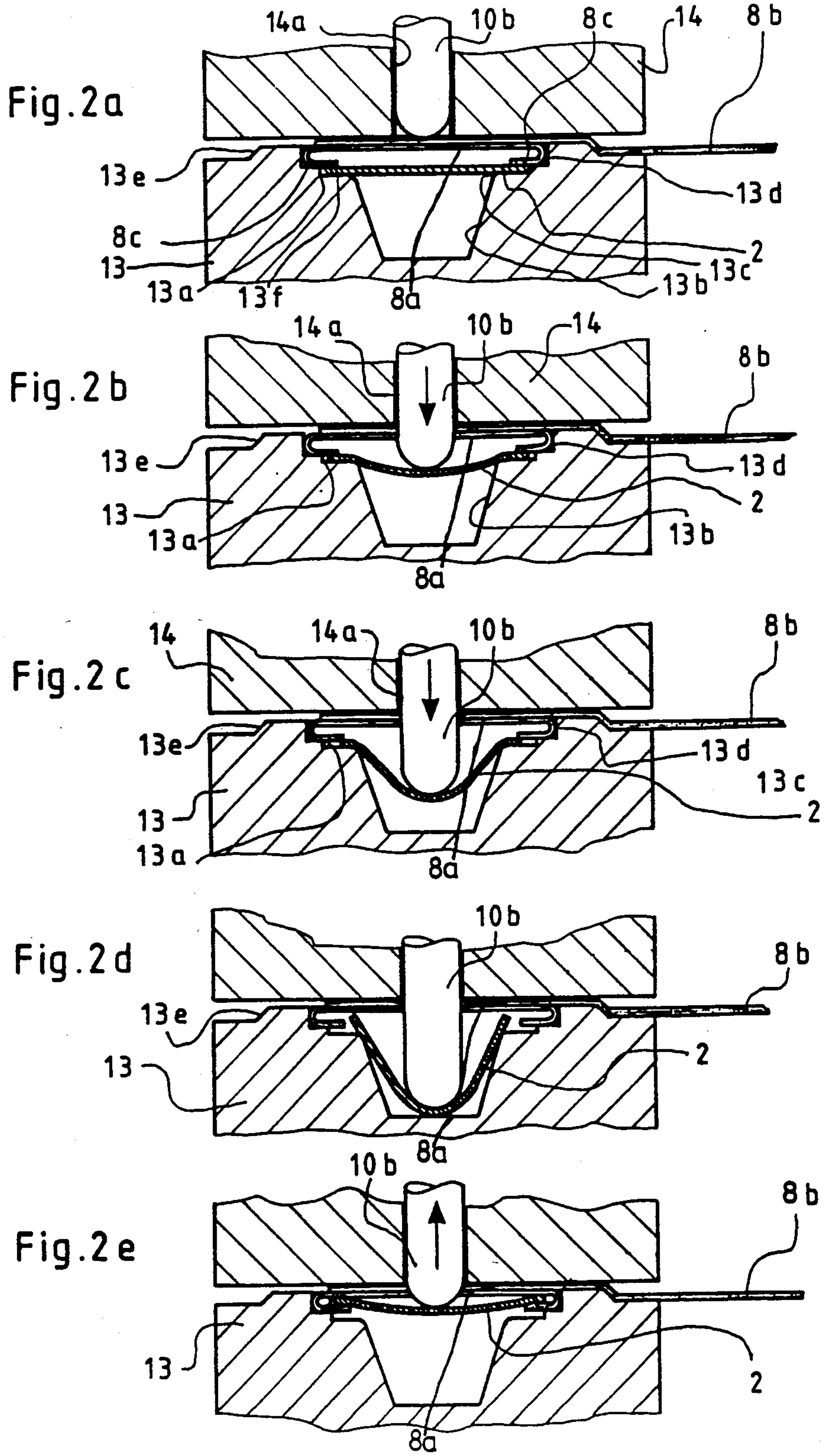
FIGS. 2*a*–2*e* are transverse sectional views of another embodiment of the mounting mechanism illustrating various stages of the mounting operation.

FIG. 2*a* shows the mounting mechanism preparatory to the mounting of the clamp 8 on the conveyor belt 2 while FIGS. 2*b*-2*e* illustrate the mounting mechanism at various stages during the mounting operation.

With reference still to FIG. 2*a,* the male die 10*b* is in an inoperative position. In this position, the male die 10*b* is flush with or above the lower surface of the cover 14. The conveyor belt 2 is stretched out flat and lies in the plane of the support surfaces 13*f* of the female die 13. As noted earlier, the width of the first channel section 13*a* matches that of the conveyor belt 2 but sufficient clearance is provided between the sides of the first channel section 13*a* and the edges of the conveyor belt 2 to permit free movement of the latter along the first channel section 13*a.* The clamp 8 rests above the conveyor belt 2 held by non-illustrated abutments located behind the same. The marginal portions of the conveyor belt 2 are confined between the hooks 8*c* of the clamp 8 and the support surfaces 13*f* of the female die 13 and are in contact with the hooks 8*c.*

If a starting pulse is now transmitted to the drive for the male die 10*b,* the drive, which may be pneumatic, for example, moves the male die 10*b* downwards. The direction of movement of the male die 10*b* is normal to the plane initially occupied by the conveyor belt 2. As the male die 10*b* moves downwards, it contacts the central portion of the conveyor belt 2 and begins to bend the central portion downwards into the die cavity 13*b* of the female die 13. This is shown in FIG. 2*b.* It will be observed that the central portion of the conveyor belt 2 begins to assume a U-shaped configuration as it is forced into the die cavity 13*b.* On the other hand, the marginal portions of the conveyor belt 2 remain confined between the hooks 8*c* of the clamp 8 and the support surfaces 13*f* of the female die 13 and hence are held in the plane originally occupied by the conveyor belt 2. As a result, two bends or points of inflection are formed in the conveyor belt 2, one at each of the edges 13*c* of the support surfaces 13*f.*

Although the marginal portions of the conveyor belt 2 engage the hooks 8*c* and the support surfaces 13*f,* the force of engagement is maintained sufficiently low to permit movement of the marginal portions relative to the hooks 8*c* and the support surfaces 13*f.* Due to bending of the central portion of the conveyor belt 2, the marginal portions begin to approach one another so that gaps are defined between the sides of the first channel section 13*a* and the edges of the conveyor belt 2. Since the conveyor belt 2 is symmetrically positioned with respect to the male die 10*b* and the die cavity 13*b* of the female die 13, the central portion of the conveyor belt 2 is bent symmetrically so that the gaps are equal.

In FIG. 2*c,* the male die 10*b* has moved through the major part of its working stroke and has bent the central portion of the conveyor belt 12 downwards correspondingly. The marginal portions of the conveyor belt 2 are still retained between the hooks 8*c* of the clamp 8 and the support surfaces 13*f* of the female die 13 but have moved closer to one another and are now held only over a very narrow region. The central portion of the conveyor belt 2 has a more clearly defined U shape. As before, the U shape is interrupted at the edges 13*c* of the support surfaces 13*f* where bends are formed in the conveyor belt 2 adjacent to the marginal portions thereof. This occurs even if the marginal portions are no longer precisely in the plane originally occupied by the conveyor belt 2.

Upon further downward movement of the male die 10*b,* the marginal portions of the conveyor belt 2 are released from the hooks 8*c* of the clamp 8. At this time, the distance between the marginal portions is less than the width of the opening defined by the hook 8*c.* Since the conveyor belt 2 is elastic, the bending stresses in the regions of the marginal portions cause the latter to snap upwards into the chamber of the gripping portion 8*a* of the clamp 8 immediately upon release of the marginal portions by the hooks 8*c.* This situation is illustrated in FIG. 2*d.* The marginal portions of the conveyor belt 2 are now in line with the legs of the U defined by the central portion thereof and the conveyor belt 2 is bent only at its center.

As mentioned previously, the distance between the edges 13*c* of the support surfaces 13*f* is less than the width of the opening defined by the hooks 8c. The difference between such distance and such width is sufficient to compensate for the inclination of the marginal portions of the conveyor belt 2 at the time that the marginal portions snap into the chamber of the gripping portion 8a of the clamp 8. This can be understood from FIG. 2d which shows that, upon snapping into the chamber, each of the marginal portions lies on a line making a predetermined angle with the horizontal. The difference between the widths of the openings defined by the edges 13c and the hooks 8c must be at least so large that a line from an edge 13c to the edge of the neighboring hook 8c coincides with, or lies to the outside of, the respective marginal portion. In other words, the line from an edge 13c to the edge of the neighboring hook 8c must make an angle with the horizontal which is equal to or smaller than the angle of the respective marginal portion with respect to the horizontal. Otherwise, the hooks 8c will interfere with entry of the marginal portions into the chamber of the gripping portion 8a of the clamp 8.

The length of the working stroke of the male die 10b is preferably selected in such a manner that the working stroke is completed at the moment that the marginal portions of the conveyor belt 2 snap into the chamber of the gripping portion 8a. Moreover, the male die 10b is advantageously arranged to begin its return stroke as soon as the marginal portions have entered the chamber of the gripping portion 8a.

When the male die 10b is retracted from the operative position of FIG. 2d, the conveyor belt 2 begins to straighten and the marginal portions of the conveyor belt 2 are caused to enter the interiors of the hooks 8c of the clamp 8. As retraction of the male die 10b proceeds, the conveyor belt 2 becomes progressively straighter and the marginal portions thereof progressively approach the respective lateral inner surfaces of the chamber delimited by the hooks 8c.

FIG. 2e shows the conveyor belt 2 shortly before completion of the return stroke of the male die 10b. The central portion of the conveyor belt 2 retains only a slight curvature while the marginal portions project well into the interiors of the hooks 8c. When the male die 10b has been fully retracted, the conveyor belt 2 is virtually flat. Since the width of the chamber delimited by the hooks 8c has a width slightly smaller than that of the conveyor belt 2 and the latter is elastic, the edges of the conveyor belt 2 come into firm frictional engagement with the lateral inner surfaces of the chamber upon complete retraction of the male die 10b. Consequently, the clamp 8 is entrained by the conveyor belt 2 which withdraws the clamp 8 from its holder as the conveyor belt 2 moves.

The mounting mechanism of FIG. 1, where the support roller 5 replaces the fixed female die 13, operates in the same manner as described with reference to FIGS. 2a–2e.

Figure 3:
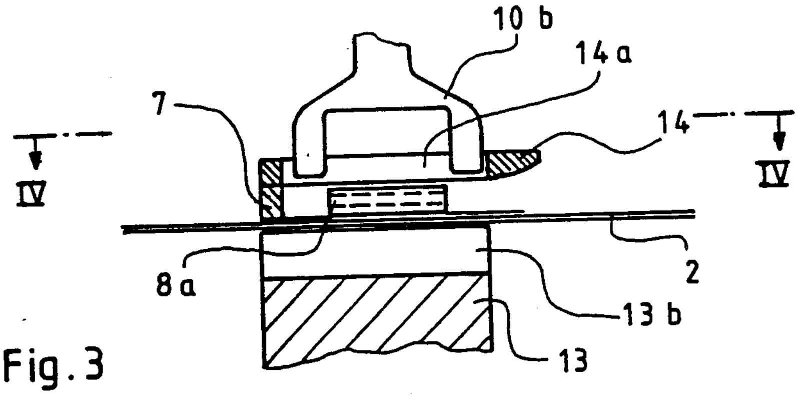
FIG. 3 is a longitudinal sectional view of a further embodiment of the mounting mechanism.
Figure 4:
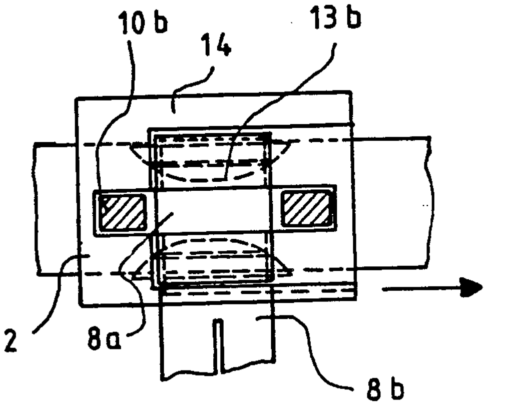
FIG. 4 is a partly sectional plan view as seen in the direction of the arrows IV—IV of FIG. 3.

FIG. 3 is a longitudinal sectional view through another embodiment of the mounting mechanism while FIG. 4 is a partly sectional plan view of the mechanism of FIG. 3. The same reference numerals as in FIGS. 1 and 2a–2e are used in FIGS. 3 and 4 to identify similar elements.

The male die 10b in FIGS. 3 and 4 is fork-shaped and includes two tines which are spaced from one another in the direction of travel of the conveyor belt 2 (indicated by the arrow in FIG. 4). The spacing between the tines is such that the tines can embrace the gripping portion 8a of the clamp 8 when the male die 10b is moved from its inoperative to its operative position. A fork-like male die 10b may be used in the mounting mechanisms of FIGS. 1 and 2a–2e thereby making it unnecessary to provide the gripping portion 8a with a cutout for the male die 10b.

As best shown in FIG. 4, the die cavity 13b in the mounting mechanism of FIGS. 3 and 4 is not strictly prismatic like that in FIGS. 2a–2e. The die cavity 13b of FIG. 4 is seen to have a pair of longitudinal ends which are spaced from one another as considered in the direction of movement of the conveyor belt 2. The width of the die cavity 13b decreases in a direction from its downstream longitudinal end to its center as well as in a direction from its upstream longitudinal end to its center, that is, the die cavity 13b narrows from either longitudinal end to its center. The decrease in width of the die cavity 13b is continuous from each longitudinal end to the center so that the narrowest location of the die cavity 13b is midway between its longitudinal ends. This location corresponds to the transverse symmetry line of the gripping portion 8a of the clamp 8 when the gripping portion 8a is positioned in the second channel section 13d.

The mounting operation illustrated in FIGS. 2a–2d can be carried out most easily if the conveyor belt 2 is stationary. However, stoppage of the conveyor belt 2 creates difficulties in the processing section of the apparatus due to the fact that the dwell times of the photosensitive material in the various processing vessels must be controlled with a relatively high degree of precision. Accordingly, stoppage of the conveyor belt 2 is possible only by means of relatively expensive equipment, e.g., per the teachings of the West German Pat. No. 22 46 313. On the other hand, the speed of the conveyor belt 2 is low compared to the speed of a properly driven male die 10b so that the delay due to stoppage can be kept very small relative to continuous movement.

The arrangement of FIG. 1, where the female die is constituted by a roller 5, allows the clamp mounting operation to be performed while the conveyor belt 2 is moving. This may be accomplished, for example, by providing the male die 10b with a roller to thereby reduce friction during the application of force to the conveyor belt 2.

If the male die 10b and the female die 13 are composed of a material having a relatively low coefficient of friction with respect to the conveyor belt 2, it is possible for the latter to travel during part of the clamp mounting operation. By way of example, the male die 10b and the female die 13 may consist of a polyamide having a polished surface in order to achieve a relatively low coefficient of friction. Furthermore, a reduction in friction may be enhanced by rounding the inner edges of the support surfaces 13f of the first channel section 13a. When the male die 10b and the female die 13 are designed to have a relatively low coefficient of friction, the conveyor belt 2 is braked during the stages of FIGS. 2b and 2c but can nevertheless continue moving at almost its original speed. The clamp 8 is maintained stationary at this time by the male die 10b. However, the clamp 8 does not become firmly entrained by the conveyor belt 2 until the latter has straightened as in the stage of FIG. 2e where the male die 10b has virtually released the clamp 8.

The work required to bend the conveyor belt 2 during the clamp mounting operation may be reduced by designing the die cavity 13b as in FIG. 4, that is, so as to taper inwards in a direction from either longitudinal end towards the center.

The method and apparatus of the invention make it possible to mount the clamp 8 on the conveyor belt 2 without moving the holder for the clamp 8 towards the belt 2.

The principles of the invention are also applicable to a flat clamp such as disclosed in the West German Pat. No. 35 35 852. The gripping portion of this clamp is provided with a cutout having a length and width which correspond approximately to the width of the conveyor belt. The gripping or engaging elements of the clamp are in the form of protuberances which extend into the cutout and are designed to engage the edges of the conveyor belt. The protuberances cooperate to define an opening for the belt.

Figure 5:
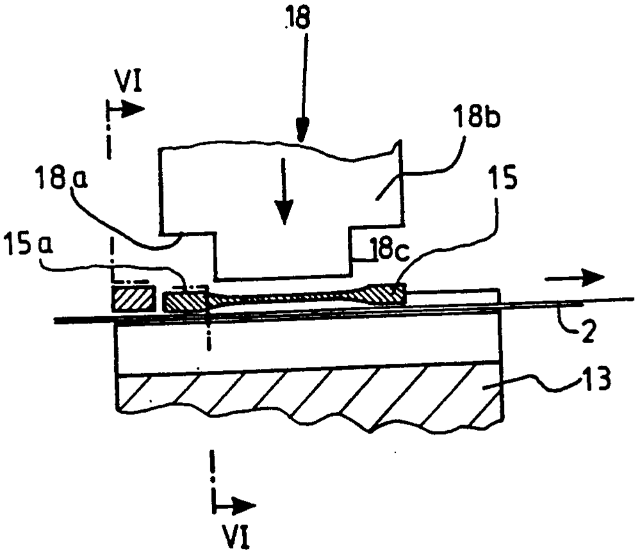
FIG. 5 is a longitudinal sectional view showing an additional embodiment of the mounting mechanism preparatory to mounting a clamp.
Figure 6:
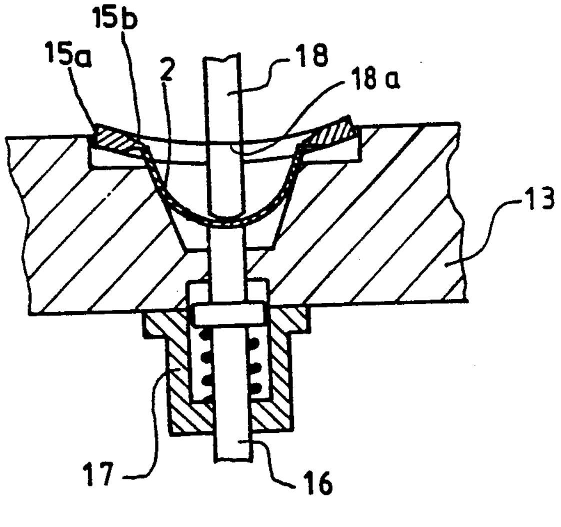
FIG. 6 is a sectional view as seen in the direction of the arrows VI—VI of FIG. 5 showing the mounting mechanism during mounting of the clamp.

FIGS. 5 and 6 illustrate a mounting mechanism for a clamp of the type taught by the West German Pat. No. 35 35 852. The reference numeral 2 in FIGS. 5 and 6 again identifies the conveyor belt while the reference numeral 13 again identifies the female die. The direction of travel of the conveyor belt 2 is indicated in FIG. 5 by the arrow.

The female die 13 of FIGS. 5 and 6 has essentially the same form as the female die 13 of FIGS. *2a–2e*. However, in contrast to the female die 13 of FIGS. *2a–2e*, the female die 13 of FIGS. 5 and 6 is provided with a spring-loaded ejector 16 which is mounted in a housing 17 disposed below the female die 13. The ejector 16 accelerates movement of the conveyor belt 2 out of the female die 13, i.e., accelerates straightening of the conveyor belt 2, after the marginal portions of the conveyor belt 2 have snapped into the gripping portion of the clamp which is here generally identified by the reference numeral 15. Such an ejector may also be used with advantage in the mounting mechanism of FIGS. *2a–2e*.

The clamp 15 is generally flat and has a central cutout which is delimited by a border 15*a* and has a length and width corresponding approximately to the width of the conveyor belt 2. Gripping or engaging elements in the form of protuberances 15*b* extend into the cutout and are designed to engage the marginal portions or edges of the conveyor belt 2.

The male die in FIGS. 5 and 6 is identified by the reference numeral 18. The male die 18 has a first or main section 18*b* and a second section or nose 18*c*. The nose 18*c* is designed to fit into the opening defined by the protuberances 15*b* of the clamp 15 while the main section 18*b* has a width exceeding that of the cutout in the clamp 15. The main section 18*b* and nose 18*c* cooperate to define shoulders 18*a* which bear against the border 15*a* of the clamp 15 when the nose 18*c* extends into the cutout of the same.

Mounting of the clamp 15 on the conveyor belt 2 is carried out in the same manner as in FIGS. *2a–2e*. The marginal portions of the conveyor belt 2 in FIGS. 5 and 6 are confined between the border 15*a* of the clamp 15 and support surfaces of the female die 13 until the marginal portions snap into the opening defined by the protuberances 15*b l of the clamp 15.*

The mounting operation for the clamp 15 differs from that of the clamp 8 in that the clamp 15 and male die 18 are designed to facilitate snapping of the marginal portions of the conveyor belt 2 into the gripping portion of the clamp 15. To this end, the clamp 15 is elastically deformable. As the male die 18 begins its working stroke, the nose 18*c* enters the opening defined by the protuberances 15*b* of the clamp 15. The length of the nose 18*c* is selected in such a manner that the shoulders 18*a* of the male die 18 come into contact with the border 15*a* of the clamp 15 shortly before the end of the working stroke of the male die 18. The shoulders 18*a* then bend the border 15*a* of the clamp 15 in such a manner that the protuberances 15*b* are rotated towards the conveyor belt 2, that is, in the direction of bending of the conveyor belt 2. This facilitates snapping of the marginal portions of the conveyor belt 2 behind the protuberances 15*b* and further makes it possible to reverse movement of the male die 18 sooner so that less bending of the conveyor belt 2 is required.

Due to the severe bending of the marginal portions of the conveyor belt 2 in the region of the protuberances 15*b* of the clamp 15, it is advantageous here also for the die cavity of the female die 13 to narrow towards the center rather than being prismatic.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution of the art and, therefore, such adaptations should and are intended to be comprehended within the meaning and range of equivalence of the appended claims.

What is claimed is:

1. A method of mounting a gripping device for photosensitive material on a flexible conveyor belt of a processing apparatus for such material, said belt having a pair of laterally spaced marginal portions and a central portion bounded by said marginal portions, and said device including a pair of spaced engaging elements defining an opening of width less than that of said belt and designed to engage said marginal portions upon entry of the latter into said opening, said method comprising the steps of confining said marginal portions between said device and a pair of spaced support surfaces, the confining step being performed in such a manner said central portion and said opening each at least partially overlap the gap between said support surfaces; bending said central portion while allowing said marginal portions to approach one another so that said marginal portions enter said opening; holding said device against bodily displacement towards said belt at least during the initial part of the bending step; and straightening said central portion so that said marginal portions are firmly engaged by said engaging elements.

2. The method of claim 1, wherein the confining and bending steps are performed in such a manner that said belt is bent substantially symmetrically during said initial part of the bending step and said engaging elements are substantially symmetrically arranged relative to said belt during said initial part of the bending step.

3. The method of claim 1, wherein the confining step comprises maintaining substantially continuous contact between said device and said marginal portions during said initial part of the bending step.

4. The method of claim 1, said belt being located in a predetermined plane prior to the bending step; and wherein the confining step comprises holding said marginal portions in said plane until said marginal portions enter said opening.

5. The method of claim 1, wherein said engaging elements comprise hook-like projections on said device designed to embrace said marginal portions.

6. The method of claim 1, wherein the bending step is performed in such a manner that the distance between said marginal portions is reduced to less than said width and said marginal portions thereupon snap into said opening.

7. The method of claim 1, said belt being located in a predetermined plane prior to the bending step; and wherein the confining and bending steps are performed in such a manner that said central portion assumes a U-shaped configuration while said marginal portions are held substantially parallel to said plane.

8. The method of claim 1, wherein the straightening step comprises resiliently biasing said central portion.

9. The method of claim 1, further comprising the step of rotating said engaging elements in the direction of bending of said central portion.

10. The method of claim 1, wherein the confining step is performed during the major part of the bending step including said initial part thereof.

11. The method of claim 1, wherein the holding step is performed substantially throughout the bending step and until entry of said marginal portions into said opening.

12. An apparatus for processing photosensitive material, comprising a flexible conveyor belt for advancing the photosensitive material, said belt having a pair of laterally spaced marginal portions and a central portion bounded by said marginal portions; a gripping device for the photosensitive material mountable on said belt, said gripping device including a pair of spaced engaging elements defining an opening of width less than that of said belt and designed to engage said marginal portions upon entry of the latter into said opening; and means for mounting said gripping device on said belt, said mounting means including means for bending said belt so that said marginal portions can approach one another to enter said opening, and means for juxtaposing said belt and said device in said bending means preparatory to bending of said belt (i) such that said central portion and said opening at least partially overlap one another, and (ii) at a distance such that said marginal portions can enter said opening by bending of said belt without bodily displacement of said device towards said belt.

13. The apparatus of claim 12, wherein said juxtaposing means is designed to position said belt and said elements substantially symmetrically relative to one another.

14. The apparatus of claim 13, wherein said juxtaposing means is designed to position said belt and said elements substantially symmetrically relative to said bending means.

15. The apparatus of claim 12, wherein said engaging elements are designed to embrace said marginal portions.

16. An apparatus for processing photosensitive material, comprising a flexible conveyor belt for advancing the photosensitive material, said belt having a pair of laterally spaced marginal portions and a central portion bounded by said marginal portions; a gripping device for the photosensitive material mountable on said belt, said gripping device including a pair of spaced engaging elements defining an opening of width less than that of said belt and designed to engage said marginal portions upon entry of the latter into said opening; and means for mounting said gripping device on said belt, said mounting means including means for bending said belt so that said marginal portions can approach one another to enter said opening, and means for juxtaposing said belt and said device in said bending means preparatory to bending of said belt such that said central portion and said opening at least partially overlap one another, said juxtaposing means comprising a guide channel for said belt and said device.

17. The apparatus of claim 16, wherein said guide channel is formed in said bending means.

18. An apparatus for processing photosensitive material, comprising a flexible conveyor belt for advancing the photosensitive material, said belt having a pair of laterally spaced marginal portions and a central portion bounded by said marginal portions; a gripping device for the photosensitive material mountable on said belt, said gripping device including a pair of spaced engaging elements defining an opening of width less than that of said belt and designed to engage said marginal portions upon entry of the latter into said opening; and means for mounting said gripping device on said belt, said mounting means including means for bending said belt so that said marginal portions can approach one another to enter said opening, and means for juxtaposing said belt and said device in said bending means preparatory to bending of said belt such that said central portion and said opening at least partially overlap one another, said bending means comprising a female die, and a cooperating male die movable between an inoperative position and an operative position in which said central portion is bent to such an extent that said marginal portions snap into said opening, said male die being arranged to reverse its direction of movement upon arrival at said operative position.

19. An apparatus for processing photosensitive material, comprising a flexible conveyor belt for advancing the photosensitive material, said belt having a pair of laterally spaced marginal portions and a central portion bounded by said marginal portions, and said belt being arranged to travel in a predetermined direction; a gripping device for the photosensitive material mountable on said belt, said gripping device including a pair of spaced engaging elements defining an opening of width less than that of said belt and designed to engage said marginal portions upon entry of latter into said opening; and means for mounting said gripping device on said belt, said mounting means including means for bending said belt so that said marginal portions can approach one another to enter said opening, and means for juxtaposing said belt and said device in said bending means preparatory to bending of said belt such that said central portion and said opening at least partially overlap one another, said juxtaposing means comprising a guide channel for said belt and said device, and said channel having an opening for said device as considered in said predetermined direction.

20. An apparatus for processing photosensitive material, comprising a flexible conveyor belt for advancing the photosensitive material, said belt having a pair of laterally spaced marginal portions and a central portion bounded by said marginal portions; a gripping device for the photosensitive material mountable on said belt, said gripping device including a pair of spaced engaging elements defining an opening of width less than that of said belt and designed to engage said marginal portions upon entry of the latter into said opening; and means for mounting said gripping device on said belt, said mounting means including means for bending said belt so that said marginal portions can approach one another to enter said opening, and means for juxtaposing said belt and said device in said bending means preparatory to bending of said belt such that said central portion and said opening at least partially overlap one another, said bending means comprising a female die, and a cooperating male die.

21. The apparatus of claim 20, wherein said male die is arranged to contact said belt substantially centrally as considered transversely of said belt.

22. The apparatus of claim 20, wherein said male die is fork-shaped.

23. The apparatus of claim 20, wherein said device is bendable and said dies are designed to bend said device, and thereby rotate said engaging elements, in the direction of bending of said central portion prior to entry of said marginal portions into said opening.

24. The apparatus of claim 23, wherein said male die includes a first section and a narrower second section receivable in said opening, said sections cooperating to define a shoulder for bending said device.

25. The apparatus of claim 20, wherein said female die is fixed.

26. The apparatus of claim 25, wherein said female die comprises a substance having a relatively low coefficient of friction relative to said belt.

27. The apparatus of claim 26, wherein said substance is a polyamide.

28. The apparatus of claim 26, wherein said female die is provided with a pair of edges for flexing said belt, said edges being rounded.

29. The apparatus of claim 20, wherein said female die is provided with a pair of spaced support surfaces for said marginal portions, the spacing between said support surfaces being smaller than the width of said opening.

30. The apparatus of claim 29, each of said engaging elements having a first edge and each of said support surfaces having a corresponding second edge; and wherein each of said marginal portions defines a predetermined angle with the horizontal upon entry into said opening, each first edge and corresponding second edge defining a line which is inclined to the horizontal at an angle equal to or smaller than the respective predetermined angle.

31. The apparatus of claim 20, wherein said female die is provided with a cavity which narrows transversely of said belt.

32. The apparatus of claim 20, further comprising a resiliently biased member for ejecting said male die from said female die.

33. The apparatus of claim 20, further comprising pneumatically, electrically, resiliently or manually operable means for moving one of said die relative to the other of said dies.

* * * * *